US008886399B2

(12) United States Patent
El Dokor et al.

(10) Patent No.: US 8,886,399 B2
(45) Date of Patent: Nov. 11, 2014

(54) SYSTEM AND METHOD FOR CONTROLLING A VEHICLE USER INTERFACE BASED ON GESTURE ANGLE

(71) Applicants: Tarek A. El Dokor, Phoenix, AZ (US); Jordan Cluster, Tempe, AZ (US); James E. Holmes, Mesa, AZ (US); Pedram Vaghefinazari, Long Beach, CA (US); Stuart M. Yamamoto, Hacienda Heights, CA (US)

(72) Inventors: Tarek A. El Dokor, Phoenix, AZ (US); Jordan Cluster, Tempe, AZ (US); James E. Holmes, Mesa, AZ (US); Pedram Vaghefinazari, Long Beach, CA (US); Stuart M. Yamamoto, Hacienda Heights, CA (US)

(73) Assignees: Honda Motor Co., Ltd., Tokyo (JP); Edge 3 Technologies LLC, Phoenix, AZ (US)

(*) Notice: Subject to any disclaimer, the term of this patent is extended or adjusted under 35 U.S.C. 154(b) by 0 days.

(21) Appl. No.: 13/834,007

(22) Filed: Mar. 15, 2013

(65) Prior Publication Data
US 2014/0277936 A1 Sep. 18, 2014

(51) Int. Cl.
G06K 9/00 (2006.01)
G06F 19/00 (2011.01)

(52) U.S. Cl.
USPC .................................. 701/36; 701/2; 345/158

(58) Field of Classification Search
USPC ............. 701/36, 1, 2; 345/158, 173; 382/225, 382/106
See application file for complete search history.

(56) References Cited

U.S. PATENT DOCUMENTS

| 6,128,003 | A | 10/2000 | Smith et al. |
|---|---|---|---|
| 7,050,606 | B2 * | 5/2006 | Paul et al. ................ 382/104 |
| 7,289,645 | B2 * | 10/2007 | Yamamoto et al. ........ 382/104 |
| 7,561,961 | B2 | 7/2009 | Wakamatsu et al. |
| 2009/0103780 | A1 | 4/2009 | Nishihara et al. |
| 2009/0278915 | A1 * | 11/2009 | Kramer et al. ............... 348/48 |
| 2010/0050133 | A1 | 2/2010 | Nishihara et al. |
| 2010/0185341 | A1 | 7/2010 | Wilson et al. |
| 2010/0231509 | A1 | 9/2010 | Boillot et al. |
| 2011/0050589 | A1 * | 3/2011 | Yan et al. ................... 345/173 |
| 2011/0221666 | A1 | 9/2011 | Newton et al. |
| 2011/0286676 | A1 * | 11/2011 | El Dokor .................... 382/225 |
| 2012/0068956 | A1 | 3/2012 | Jira et al. |
| 2013/0030811 | A1 | 1/2013 | Olleon et al. |
| 2013/0261871 | A1 * | 10/2013 | Hobbs et al. ................. 701/28 |

OTHER PUBLICATIONS

Guo, D., et al., "Vision-Based Hand Gesture Recognition for Human-Vehicle Interaction," *Proceedings of the International Conference on Control, Automation and Computer Vision*, 1998, pp. 151-155, vol. 1.
Howley, D., "Mercedes Benz's DICE Augmented Reality System: Minority Report for Your Car," Laptopmag.com, Jan. 12, 2012, 3 pages [online] [retrieved on May 25, 2012] Retrieved from the internet <URL:http://blog.laptopmag.com/mercedes-benzs-dice-augemented-reality-system-minority-report-for-your-car>.

(Continued)

*Primary Examiner* — Tan Q Nguyen
(74) *Attorney, Agent, or Firm* — Fenwick & West LLP

(57) ABSTRACT

An in-vehicle computing system allows a user to control components of the vehicle by performing gestures. The user provides a selecting input to indicate that he wishes to control one of the components. After the component is identified, the user performs a gesture to control the component. The gesture and the component that was previously selected are analyzed to generate a command for the component. Since the command is based on both the gesture and the identified component, the user can perform the same gesture in the same position within the vehicle to control different components.

27 Claims, 7 Drawing Sheets

(56) References Cited

OTHER PUBLICATIONS

Mashita, T., et al., "A Wearable Camera System for Pointing Gesture Recognition and Detecting Indicated Objects," *Proceedings of the 2003 Conference on Computer Vision and Pattern Recognition Workshop (CVPRW '03)*, 2003, six pages.

Yoon, H.-S., et al., "Hand gesture recognition using combined features of location, angle and velocity," *Pattern Recognition*, 2001, pp. 1491-1507, vol. 34.

\* cited by examiner

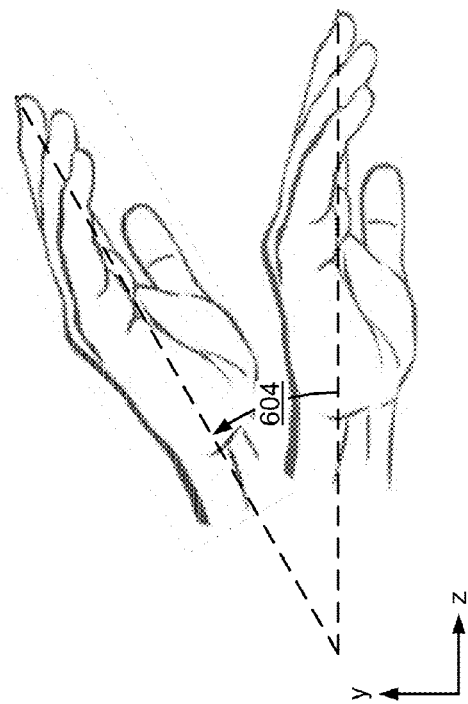
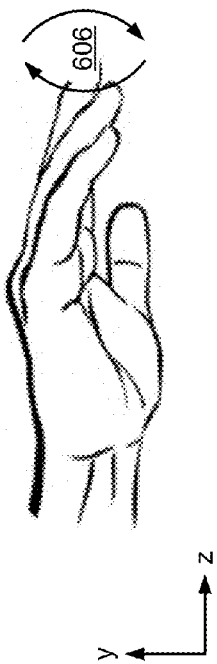
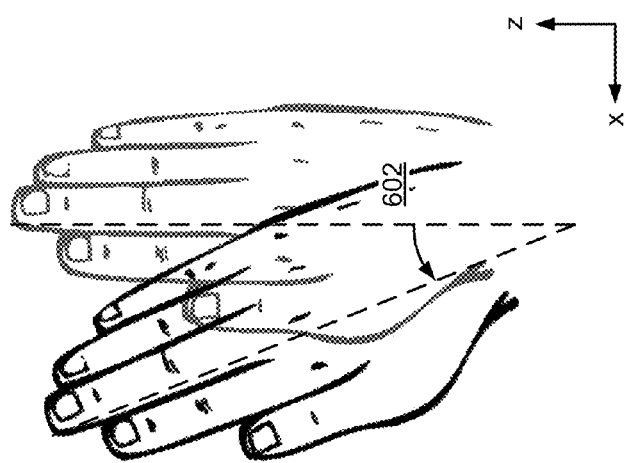
FIG. 6B
FIG. 6C
FIG. 6A

SYSTEM AND METHOD FOR CONTROLLING A VEHICLE USER INTERFACE BASED ON GESTURE ANGLE

CROSS-REFERENCE TO RELATED APPLICATION

This application is related to U.S. application Ser. No. 13/228,395, entitled "Vehicle User Interface System," which is incorporated by reference herein in its entirety.

BACKGROUND

1. Field of the Disclosure

The present disclosure relates generally to gesture recognition and in particular to controlling different components of a vehicle with gestures.

2. Description of the Related Arts

Conventionally, a user in a vehicle can interact with features in a vehicle by interacting with physical controls such as knobs, dials, and switches on a console inside the vehicle. Physical controls are commonly used to perform adjustments like tilting the side mirrors or air conditioning vents or to interact with a multimedia system in the vehicle. Alternatively, a vehicle may include an integrated computing system that allows a user to control various components of the vehicle by performing physical gestures on a touchscreen that displays a user interface. However, it is often cumbersome and inconvenient for the user to reach forward or sideways to interact with a touchscreen or manipulate a physical control, and these conventional devices frequently present the user with a large number of functions that can be confusing and difficult to use.

SUMMARY

A computing system allows a user to control a component of a vehicle by performing a gesture. The system identifies a first component of the vehicle based on a first selecting input performed by the user. After the user performs a gesture, the system receives a first data signal representing the first gesture. Gesture recognition is performed on the first data signal to generate a first command for controlling the first component. After the first command is generated, the process can be repeated for a second component. The system identifies the second component of the vehicle based on a second selecting input, and the user performs a second gesture. The system receives a second data signal representing the second gesture and performs gesture recognition on the second data signal to generate a second command.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present disclosure can be readily understood by considering the following detailed description in conjunction with the accompanying drawings.

FIGS. 6A-6C illustrate examples of gesture angles.

DETAILED DESCRIPTION OF EMBODIMENTS

Embodiments are now described with reference to the accompanying figures. Like reference numbers indicate identical or functionally similar elements. Also in the figures, the left most digit of each reference number corresponds to the figure in which the reference number is first used.

Overview

An in-vehicle computing system contains a gesture control module that allows a user to control components of the vehicle by performing gestures. The user first may provide a selecting input to indicate that he wishes to control one of the components. For example, the selecting input can include a pointing gesture directed at the component or a voice command identifying the component. The gesture control module analyzes the selecting input to identify the component.

After the component is identified, the user may perform a gesture to control the component. The gesture control module analyzes the gesture and the component that was previously identified in order to generate a command for the component. For example, if the user identified a side mirror and performed a gesture in which he tilts his hand, then the gesture control module generates a command to tilt the side mirror in a similar manner.

Since the command is based on both the gesture and the identified component, the user can perform the same gesture in the same position within the vehicle to control different components. For example, the user can provide a selecting input to identify the side mirror and perform a hand tilting gesture to adjust the orientation of the mirror. After the adjustment is complete, the user can provide a selecting input to identify an air conditioning vent and perform the same hand tilting gesture to adjust the airflow direction of the vent. This results in an intuitive gesture control system that does not require the user to memorize a different set of gestures to control each component.

Operating Environment

Figure 1:
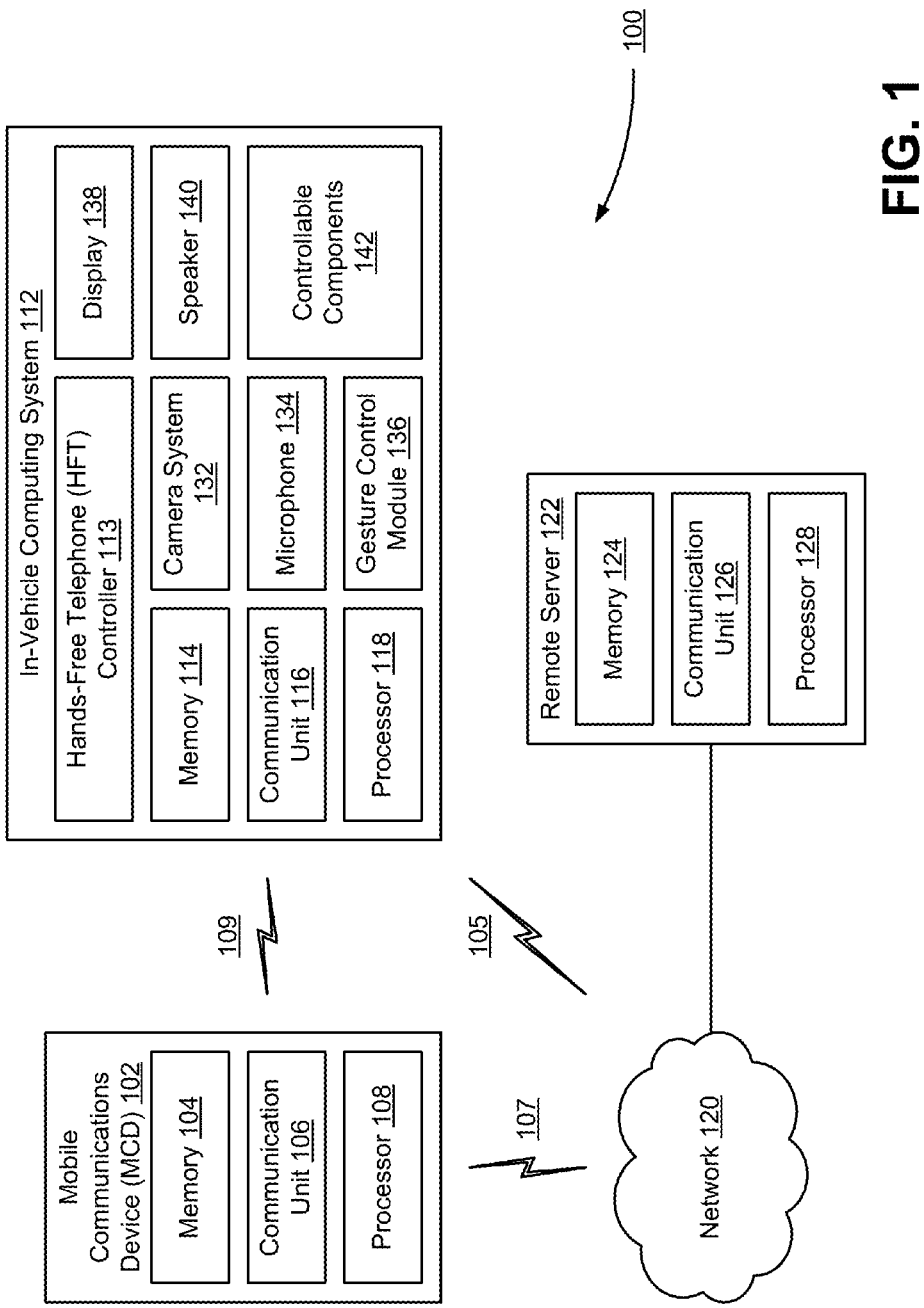
FIG. 1 illustrates an exemplary operating environment 100 for various embodiments of the gesture control module.

FIG. 1 illustrates an exemplary operating environment 100 for various embodiments. The operating environment 100 may include an in-vehicle computing system 112. One example of such a system is an in-vehicle hands free telephone (HFT) controller 113 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and the wireless mobile communication device 102, a wireless networking communication link 107 between the wireless mobile communication device 102 and the network 120, and a remote server 122 connected to the network 120. The communication links described herein can directly or indirectly connect these devices. The network 120 can be a wireless communication network such as a cellular network comprised of multiple base stations, controllers, and a core network that typically includes multiple switching entities and gateways, for example.

The functions described herein are set forth as being performed by a device in the operating environment 100 (e.g., the in-vehicle computing system 112, the MCD 102, and/or the remote server 122). In embodiments, these functions can be performed in any of these devices or in any combination of these devices and/or other devices.

The operating environment 100 includes input devices, such as a camera system 132 and a microphone 134. The camera system 132 and/or microphone 134 can be part of the in-vehicle system 112 (as shown in FIG. 1) or can be in the MCD 102 (not shown), for example. In one embodiment, the camera system 132 includes a sensor that captures physical signals from within the vehicle (e.g., a time of flight camera, an infrared sensor, a traditional camera, etc). The camera system 132 is positioned to capture physical signals from a user such as hand or arm gestures from a driver or passenger. The camera system 132 can include multiple cameras positioned to capture physical signals from a single capture region in the vehicle or from various capture regions in the vehicle, e.g., driver seat, front passenger seat, second row seats, etc. Alternatively, the camera system 132 may be a single camera which is focused on one capture region (e.g., the driver seat), has a wide field of view, and can receive signals from more than one occupant of the vehicle, or can change its field of view to receive signals from different occupant positions.

In another embodiment, the camera system 132 is part of the MCD 102 (e.g., a camera incorporated into a smart phone), and the MCD 102 can be positioned so that the camera system 132 captures gestures performed by the occupant. For example, the camera system 132 can be mounted so that it faces the driver and can capture gestures by the driver. The camera system 132 may be positioned in the cabin or pointing toward the cabin and can be mounted on the ceiling, headrest, dashboard or other locations in/on the in-vehicle system 112 or MCD 102.

After capturing a physical signal, the camera system preferably 132 outputs a data signal representing the physical signal. The format of the data signal may vary based on the type sensor(s) that were used to capture the physical signals. For example, if a traditional camera sensor was used to capture a visual representation of the physical signal, then the data signal may be an image or a sequence of images (e.g., a video). In embodiments where a different type of sensor is used, the data signal may be a more abstract or higher-level representation of the physical signal.

The microphone 134 may capture audio signals from inside the vehicle. In one embodiment, the microphone 134 can be positioned so that it is more sensitive to sound emanating from a particular position (e.g., the position of the driver) than other positions (e.g., other occupants). The microphone 134 can be a standard microphone that is incorporated into the vehicle, or it can be a microphone incorporated into the MCD 102. The microphone 134 can be mounted so that it captures voice signals from the driver. For example, the microphone 138 may be positioned in the cabin or pointing toward the cabin and can be mounted on the ceiling, headrest, dashboard or other locations in/on the vehicle or MCD 102.

The gesture control module 136 sends control signals to the controllable components 142 based on inputs from the camera system 132 and (optionally) the microphone 134. After receiving one or more inputs, the module 136 may provide feedback to the user via the display 138 and/or the speaker 140 to provide confirmation that the user has performed a gesture or voice command correctly and/or prompt the user to provide an additional input. A detailed description of the components and operation of the control module 136 is presented below.

The operating environment 100 also includes output devices, such as a display 138 and a speaker 140. The display 138 receives and displays a video signal. The display 138 may be incorporated into the vehicle (e.g., an LCD screen in the central console, a HUD on the windshield), or it may be part of the MCD 102 (e.g., a touchscreen on a smartphone). In one embodiment, the display 138 presents a user interface that allows the user to change settings of various components in the vehicle. The speaker 140 receives and plays back an audio signal. Similar to the display 138, the speaker 140 may be incorporated into the vehicle, or it can be a speaker incorporated into the MCD 102.

The controllable components 142 include components of the vehicle that can be controlled with gestures performed by the user. For example, the components 142 may include devices with an adjustable orientation, such as a rearview mirror, exterior side mirrors, and air conditioning outlets. The components 142 may also include physical controls that are used to control functions of the vehicle. For example, the components 142 may include buttons and knobs for controlling the air conditioning, multimedia system, or navigation system of the vehicle. The controllable components 142 may also include a screen in the vehicle that displays a gesture-controlled user interface.

Some or all of the controllable components 142 may provide the user with an additional control method that does not involve gesture recognition. For example, components with an adjustable orientation (e.g., a mirror or an air conditioning vent) may include a mechanical interface that allows the user to change the component's orientation by adjusting one or more levers.

The in-vehicle hands-free telephone (HFT) controller 113 and wireless mobile communication device (MCD) 102 may communicate with each other via a short-range communication link 109 which uses short-range communication technology, such as, for example, Bluetooth® technology or other short-range communication technology, for example, Universal Serial Bus (USB). The HFT controller 113 and mobile communications device 102 may connect, or pair, with each other via short-range communication link 109. In one embodiment, the vehicle can include a communications unit 116 that interacts with the HFT controller 113 to engage in the short range communications, a memory unit device 114, and a processor 118. The HFT controller 113 can be part of a vehicle's telematics system which includes memory/storage, processor(s) and communication unit(s). The HFT controller 113 can utilize the vehicle's telematics unit to assist in performing various functions. For example, the communications unit 116 and/or processor 118 can be part of the vehicle's telematics unit or can be a separate unit in the vehicle.

The processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in each device in FIG. 1, multiple processors may be included in each device. The processors can comprise an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. The MCD 102 includes a communications unit 106, a memory unit device 104, and a processor 108. The MCD 102 also includes an operating system and can include various applications either integrated into the operating system or stored in memory/storage 104 and executed by the processor 108. In a common form, an MCD application can be part of a larger suite of vehicle features and interactions. Examples of applications include applications available for the IPhone™ that is commercially available from Apple Inc., Cupertino, Calif., applications for phones running the Android™ operating system that is commercially available from Google, Inc., Mountain View, Calif., applications for BlackBerry devices, available from Research In Motion Ltd., Waterloo, Ontario, Canada, and/or applications available for Windows Mobile devices, available from Microsoft Corp., Redmond, Wash.

In alternate embodiments, the mobile communication device 102 can be used in conjunction with a communication device embedded in the vehicle, such as a vehicle-embedded phone, a wireless network card, or other device (e.g., a Wi-Fi capable device). For ease of discussion, the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

The mobile communication device 102 and the in-vehicle system 112 may exchange information via short-range communication link 109. The mobile communication device 102 may store information received from the in-vehicle system 112, and/or may provide the information (such as voice and/or gesture signals) to a remote processing device, such as, for example, the remote server 122, via the network 120. The remote server 122 can include a communication unit 126 to connect to the network 120, for example, a memory/storage unit 124 and a processor 128.

In some embodiments, the in-vehicle system 112 may provide information to the mobile communication device 102. The mobile communication device 102 may use that information to obtain additional information from the network 120 and/or the server 122. The additional information may also be obtained in response to providing information with respect to a prompt on wireless mobile communication device 102 from in-vehicle system 112.

The network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Control of a Vehicle Component with Gestures

Figure 2:
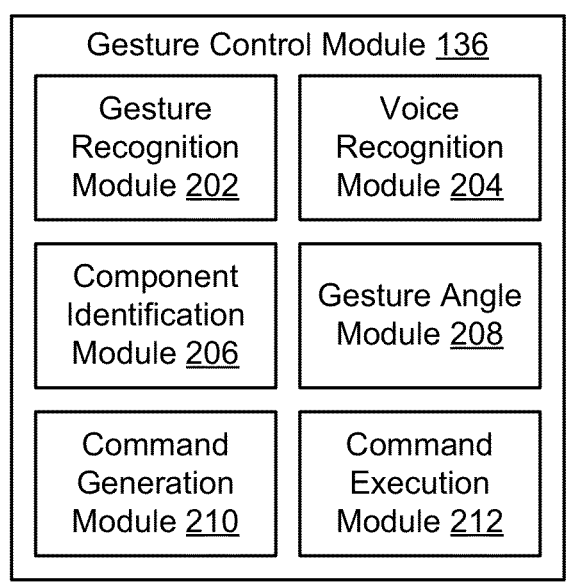
FIG. 2 is a block diagram illustrating components of the gesture control module, according to one embodiment.

FIG. 2 is a block diagram illustrating components of the gesture control module 136 of the in-vehicle computing system 112 of FIG. 1, according to one embodiment. The gesture control module 136 includes a gesture recognition module 202, a voice recognition module 204, a component identification module 206, a gesture angle module 208, a command generation module 210, and a command execution module 212. In alternative embodiments, the gesture control module 136 may include additional, fewer, or different components, and the functionality of the components 202 through 212 described herein may be distributed among components of the information retrieval module 136 in a different manner.

The gesture recognition module 202 receives a data signal from the camera system 132 and performs a gesture recognition algorithm on the received data signal. The gesture recognition algorithm generates gesture data representing the gesture that was captured by the camera system 132. As described above with reference to the camera system 132, the data signal is an electronic representation of a gesture that the user performed in the vehicle. For example, the data signal may be an image of the gesture, a sequence of images, or some other representation of the gesture.

The gesture data generated by the gesture recognition module 202 is a high-level machine-readable representation of the gesture captured by the camera system 132. In one embodiment, the gesture includes three-dimensional coordinates of the extremities and joints in the user's hand and forearm. For example, the gesture data may include coordinates representing the three-dimensional positions of user's elbow, wrist, and the fingertip and knuckles of each of the user's finger.

In another embodiment, the gesture recognition module 202 determines three-dimensional coordinates as described above and performs additional processing to determine a position of the hand, a plane representing the orientation of the hand, and the angle at which each joint is bent. In this embodiment, the gesture recognition module 202 outputs the hand position, orientation plane, and joint angles as the gesture data. For example, the gesture recognition module 202 can determine the position of the hand by calculating a midpoint between the coordinates representing the positions of the knuckles and the wrist. The orientation plane and the joint angles may be determined by performing similar arithmetic calculations on the coordinate data for the hand and forearm.

The voice recognition module 204 receives an output signal from the microphone 134 and performs a voice recognition algorithm on the received signal to recognize spoken words and other audio captured by the microphone 134. The voice recognition module 204 generates and outputs voice data representing words in the audio input. Similar to the gesture data, the voice data is a high-level machine-readable representation of the audio captured by the microphone. For example, the voice data may be a character string containing words that were spoken by the user.

The component identification module 206 analyzes data from the gesture recognition module 202 and/or the voice recognition module 204 to identify a component of the vehicle. After identifying the component, the module 206 preferably outputs a component identifier. In one embodiment, the component identification module 206 analyzes gesture data representing an identifying gesture. For example, the gesture data may represent a pointing gesture directed toward one of the controllable components 142 of the vehicle. In this embodiment, the component identification module 206 stores three-dimensional coordinates representing the position of each component 142, and the module 206 identifies the component 142 by generating a line matching the direction of the pointing gesture and finding the component 142 whose coordinates are closest to the line. Processing may continue without the output of such a component identifier.

In another embodiment, the component identification module 206 analyzes voice data representing a voice command. For example, if the user speaks the name of the component 142 that the user wishes to control, then the received voice data is a character string containing the name that was spoken. In this embodiment, the component identification module 206 stores a name for each component 142 and identifies the component 142 by matching the voice data to the closest stored name. In still another embodiment, the component identification module 206 receives a combination of gesture data and voice data and analyzes both types of data to identify a component 142. For example, the user may speak the name of a component 142 while pointing at the component 142.

The gesture angle module 208 analyzes gesture data from the gesture recognition module 202 to measure one or more gesture angles associated with a gesture performed by the user. In one embodiment, the gesture angle module 208 first establishes a reference position of the gesture (e.g., the starting position of a hand or finger) and measures one or more gesture angles as the hand or finger is tilted relative to the reference position. The operation of the gesture angle module is described in greater detail below.

The command generation module 210 generates a command for a component based on a component identifier from the component identification module 206 and one or more gesture angles from the gesture angle module 208. The command is a high-level instruction to adjust the identified component in a particular manner. In one embodiment, the command includes a function and one or more parameters for the function. For example, in a command to rotate the right side mirror to a particular orientation, the function is to rotate the right side mirror, and the parameters are the angles defining the desired orientation of the mirror.

In an embodiment where the command includes a function and one or more parameters, the command generation module 210 may calculate the parameters based on the gesture angles. For example, in a command to rotate the side mirror, the module 210 may calculate parameters that cause the orientation of the side mirror to mimic the orientation of the user's hand (as defined by the gesture angles). Meanwhile, the module 210 selects the function based on the component identifier. For example, the module 210 would select a function to rotate the right side mirror if it receives an identifier for the right side mirror.

In another embodiment, the command generation module 210 preferably receives gesture data directly from the gesture recognition module 202 either in addition to or in place of receiving gesture angles from the gesture angle module 208. In this embodiment, the module 210 may select the function based on a combination of the component identifier, the gesture data, and the gesture angles. For example, suppose the module 210 receives an identifier for an air conditioning vent. If the module 210 also receives a gesture angle (thus indicating that the user has tilted his hand), it selects a function to adjust the direction of the vent and calculates parameters that represent the orientation of the user's hand. Alternatively, if the module 210 receives gesture data representing a pinch gesture between the user's thumb and forefinger, then it selects a function to adjust the flow rate through the identified vent and calculates a parameter representing the distance between the thumb and forefinger. The parameter is then used to set the new flow rate of the vent. The ability to select a function based on a combination of the component identifier and the gesture beneficially allows a user to perform gestures to control multiple aspects of the same component 142.

The command execution module 212 receives a command from the command generation module 210 and sends control signals to the identified component to cause the component to perform the command. The control signals directly control devices that perform the command. For example, if the command is to rotate the right side mirror to a particular orientation, as described above, the command execution module 212 sends control signals to motors that adjust the orientation of the mirror.

In other embodiments, some or all of the modules 202 through 212 of the gesture control module 136 are positioned external to the in-vehicle system 112. In one embodiment, the modules 202 through 212 are implemented as an application downloaded to the MCD 102 (e.g., applications available from iTunes). In another embodiment, the modules 202 through 208 are implemented on the remote server 122, and data from the camera system 132 and microphone 134 are sent over the network 120 to the remote server 122 to be analyzed.

Figure 3:
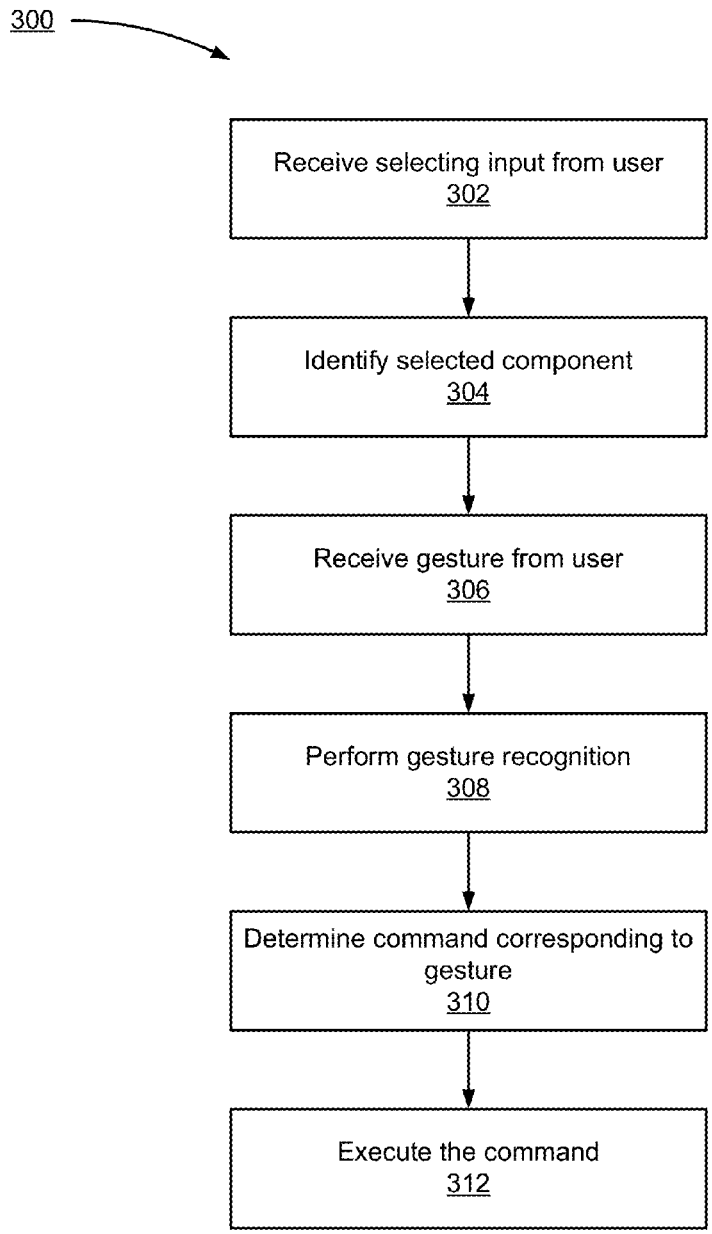
FIG. 3 is a flow chart illustrating a process for selecting a component of a vehicle and controlling the component based on a gesture, according to one embodiment.

FIG. 3 is a flow chart illustrating a process 300 for selecting a component of the vehicle and controlling the component 142 with a gesture, according to one embodiment. For ease of discussion, the process 300 shown in FIG. 3 will be described below in conjunction with the example shown in FIGS. 4A-4D.

The process 300 begins when the user performs a selecting input to identify one of the controllable components 142. The selecting input can be any combination of voice input, gesture input, and any other user input that can be captured by input devices within the vehicle. In the example shown in FIG. 4A, the selecting input includes a voice command 402 with the name of the component and a pointing gesture 404 directed toward the component. Although the pointing gesture 404 shown in FIG. 4A includes the user's entire arm, a pointing gesture 404 may alternatively be a different gesture that defines a direction. For example, the user may perform a pointing gesture 404 with a single finger while keeping the rest of his hand on the steering wheel.

The input devices in the vehicle capture the selecting input and send signals representing the selecting input to the gesture control module 136, where the signals are received 302 by the gesture recognition module 202 and the voice recognition module 204. As described above with reference to FIG. 2, the gesture recognition module 202 performs gesture recognition on a data signal received from the camera system 132. Meanwhile, the voice recognition module 204 performs voice recognition on a voice signal received from the microphone 134.

The component identification module 206 receives data representing the selecting input (e.g., the gesture data and voice data) and analyzes the data to identify 304 the selected component. As described above with reference to the component identification module 206, the module 206 outputs a component identifier after identifying the component.

In one embodiment, the in-vehicle computing system 112 outputs a confirmation signal using the display 138 or the speaker 140 after identifying the component. The confirmation signal indicates to the user that the component has been successfully identified and that the user can proceed to perform a gesture to control the component. The confirmation signal may also indicate a function that will be executed after the user performs the gesture. In the example shown in FIG. 4B, the speakers 140 play back an audio confirmation signal 406 to indicate that the rearview mirror has been selected and that the user can begin performing a gesture to adjust the orientation of the mirror. Although not shown in FIG. 4B, the system 112 may additionally be configured to show an image or animation on the display 138 to convey similar information (e.g., an image of the rearview mirror surrounded by arrows).

In this embodiment, the system 112 may also be configured to receive and process an input from the user indicating that an incorrect component was identified. For example, the system 112 reverts to step 302 if the user performs a voice command to say "incorrect component" after the confirmation signal is output. This allows the user to confirm that the correct component was identified before performing a gesture to control the component, which is beneficial because it prevents the user from accidentally performing a gesture to control the wrong component.

Figure 4A:
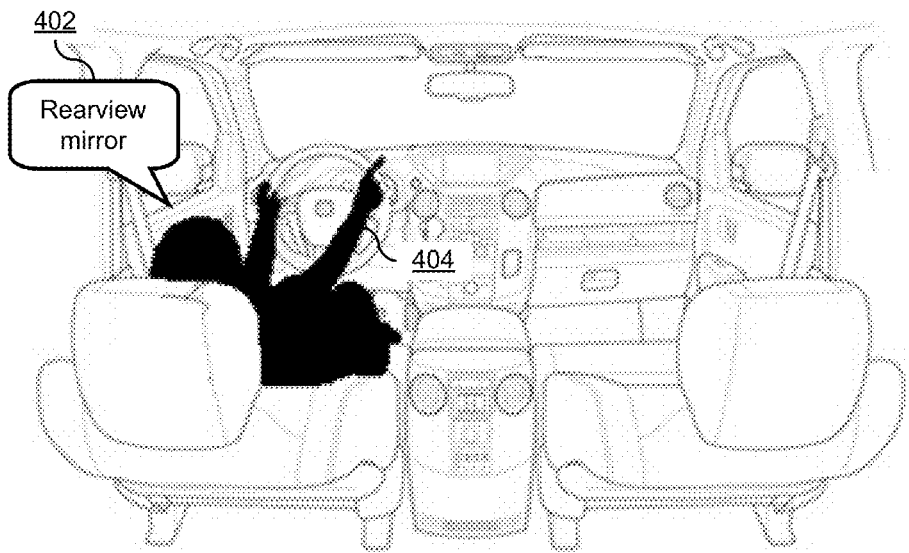
FIGS. 4A-4D illustrate an example of selecting a component of a vehicle and controlling the component based on a gesture.
Figure 4B:
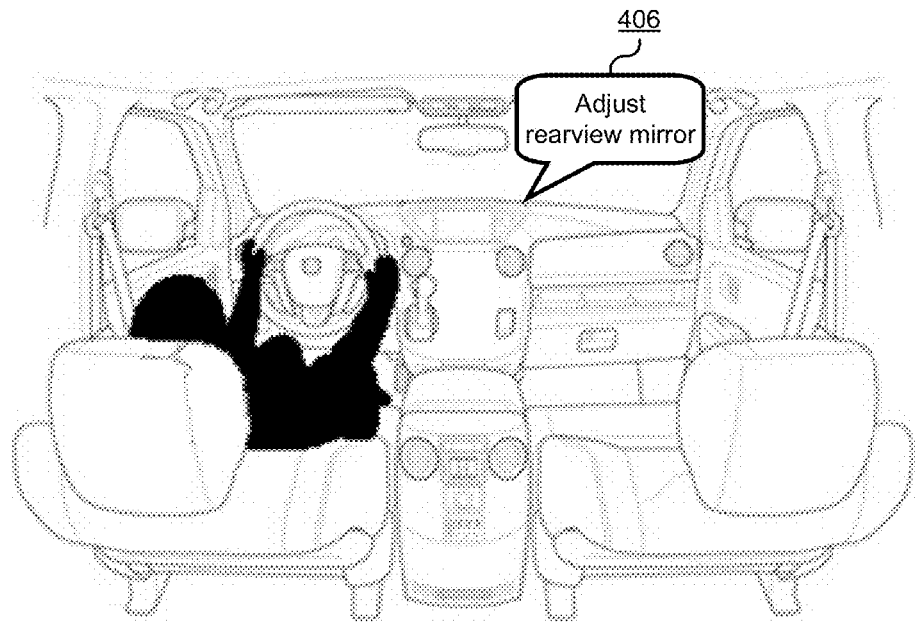
Figure 4C:
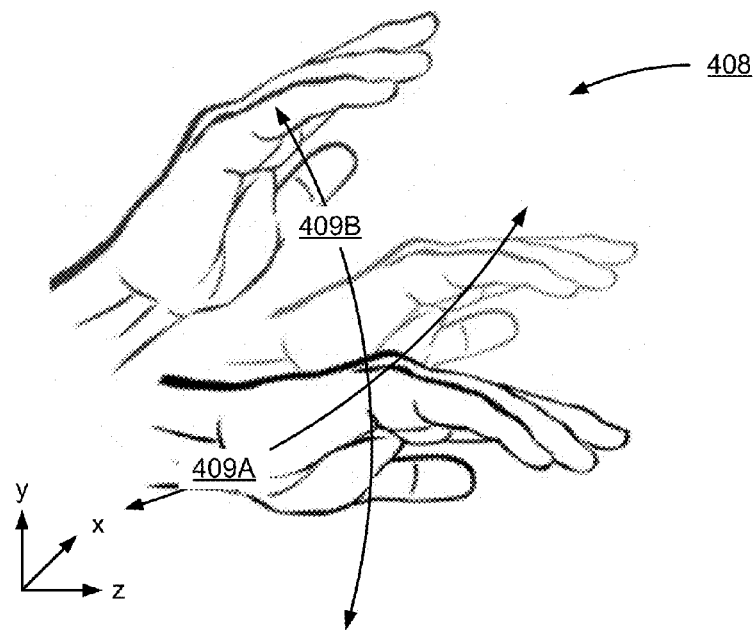

After the component is successfully identified, the user performs a gesture within the capture region of the camera system 132 so that the camera system 132 can capture the gesture. As shown in the example of FIG. 4C, the gesture 408 can include an angular motion in the horizontal direction 409A and/or the vertical direction 409B. The gesture recognition module 136 receives 306 a data signal representing the gesture and performs 308 gesture recognition on the data signal.

The gesture angle module 208 and the command generation module 210 operate together to determine 310 a command corresponding to the gesture based on the component identifier and the gesture data. As described above, a command contains a function and one or more parameters. For example, the function generated in the example illustrated in FIGS. 4A-4D is to rotate the rearview mirror (because the rearview mirror is the identified component), while the parameters are angles defining the desired orientation of the mirror.

In one embodiment, the gesture angle module 208 analyzes the gesture data to measure one or more gesture angles, and command generation module 210 uses the gesture angles to generate the parameters. For example, the command generation module 210 may generate angles that cause the mirror to rotate in a manner that mimics the movement of the user's hand.

In another embodiment, the command generation module 210 also receives gesture data directly from the gesture recognition module 202. In this embodiment, the module 210 may use the gesture data to calculate one or more parameters without measuring any gesture angles. For example, the module 210 may calculate a parameter based on a pinching gesture performed by the user.

Figure 4D:
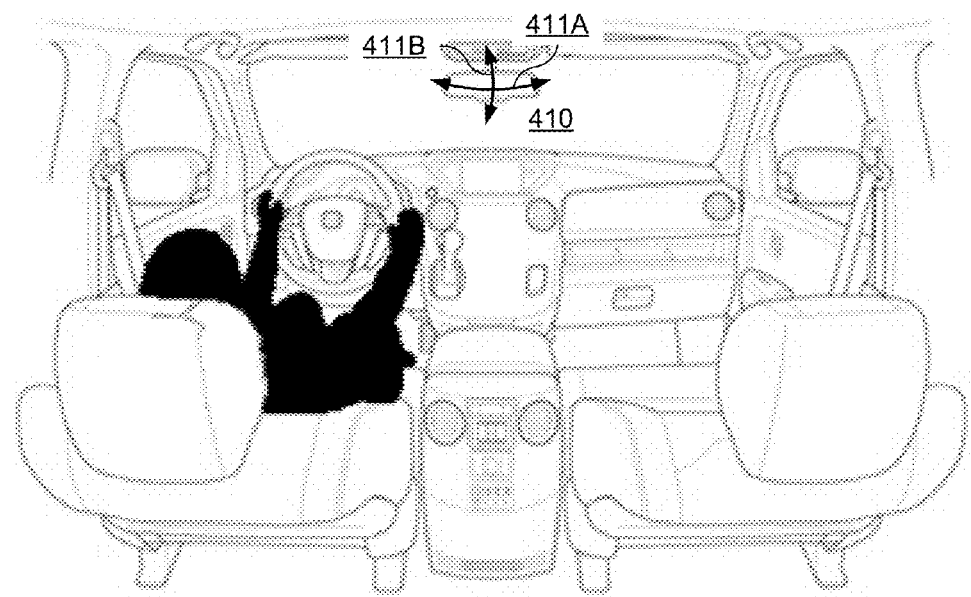

The command execution module 212 executes 312 the command by generating control signals for the appropriate devices. In the example of FIG. 4D, the command execution module 212 generates control signals for the motors that cause the rearview mirror 410 to rotate in the horizontal and vertical directions 411A, 411B.

In one embodiment, the process of executing a command based on a gesture (i.e., steps 306 through 312) operates in real-time. For example, as the user performs the tilting gesture 408 shown in FIG. 4C, the rearview mirror 410 shown in FIG. 4D moves simultaneously in order to mimic the changing orientation of the user's hand. This beneficially provides the user with real-time feedback as the command is being executed so that the user can make more accurate adjustments. For example, if the user accidentally tilts his hand too far and causes the mirror 410 to rotate farther than desired, the user can simply tilt his hand in the opposite direction until the mirror 410 reaches its desired position.

In one embodiment, the gesture control module 136 presents the user with an option to invert the identified component's direction of motion relative to the user's hand gestures. For example, in order to have the rearview mirror 410 mimic the motion of the user's hand, the user can configure the module 136 to tilt the mirror 410 upward when the user tilts his hand upward. Alternatively, the user can configure to module 136 to tilt the rearview mirror 410 downward when the user tilts his hand upward to give the illusion that the user's hand defines the normal vector of the mirror 410. The motion of a component in the horizontal direction can similarly be inverted in this manner. The option to invert a direction of motion is beneficial because different users will find different settings to be more intuitive.

The gesture control module 136 may additionally present the user with an option to adjust sensitivity when controlling a component. For example, when the user tilts his hand by ten degrees when performing a gesture, the component can be configured to rotate by 5 degrees, 8 degrees, 10 degrees, 15 degrees, or some other angular displacement.

Although the process 300 of FIG. 3 was described with reference to an example in which the rearview mirror was adjusted, the process 300 can be used to control a wide range of components within the vehicle. For example, the user can adjust the volume of a particular speaker in the vehicle's sound system by identifying the speaker (e.g., by pointing at the speaker or issuing a voice command such as "passenger door speaker") and performing a gesture to indicate a desired volume level. The gesture can be a pinching motion, a twirling motion performed with a finger (to simulate rotating a real-life volume knob), a tilting motion performed with a hand (e.g., the motion shown in FIG. 4C), or some other motion that can be recognized by the gesture recognition module 202.

In another example, the user can navigate a user interface on the display 138 by identifying the display and performing gestures. In this example, the gestures may control a cursor or some other position indicator on the user interface. Alternatively, the gestures may be used to navigate a menu structure. For example, the system may be configured to move between items in the same level of the menu structure when the user tilts his hand up or down, move to a higher level when the user tilts his hand to the left, and select a menu item when the user tilts his hand to the right.

Since the process 300 described with reference to FIG. 3 begins with steps 302 and 304 for identifying a component, the same gesture performed in the same capture area can be used to issue different commands to different components. For example, depending on the component that was selected, the same hand tilting gesture 408 (shown in FIG. 4C) can be used to control the rearview mirror 410, one of the side mirrors, a user interface on the display 138, or one of the air conditioning vents. This improves the ease of use of the gesture control system described herein because the user does not have to learn a separate set of gestures to control each component of the car.

Measurement of Gesture Angles

Figure 5:
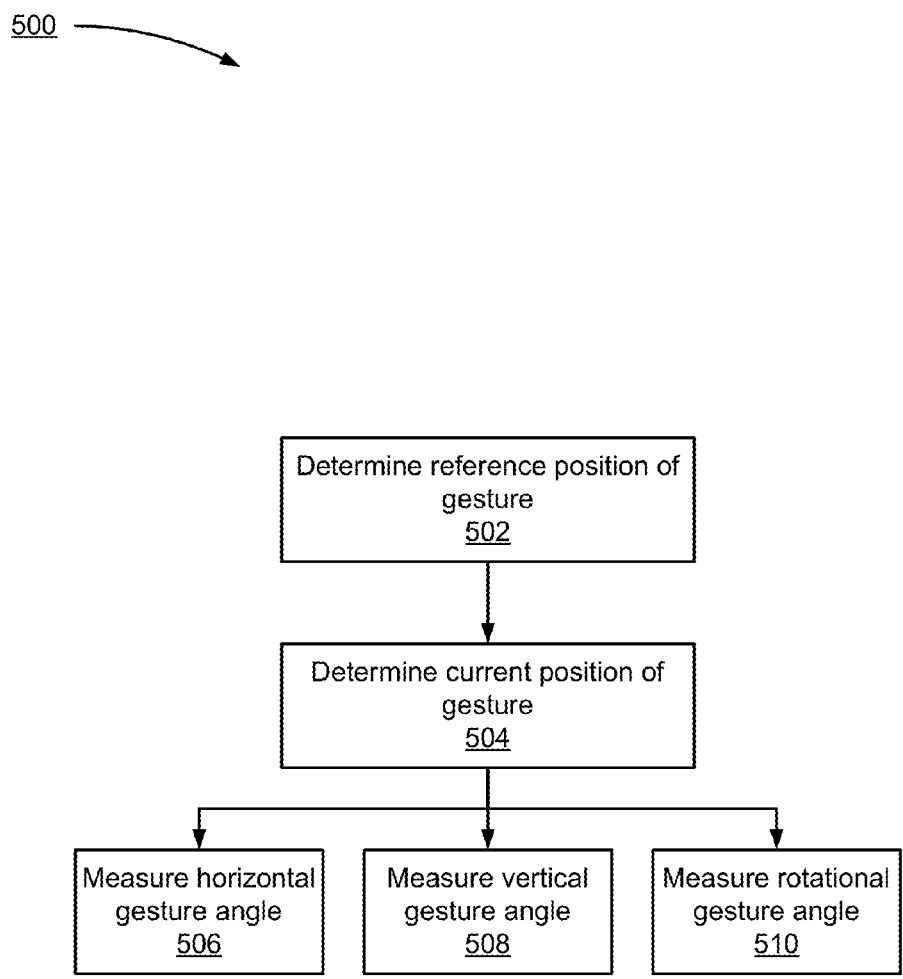
FIG. 5 is a flow chart illustrating a process for measuring gesture angles, according to one embodiment.

FIG. 5 is a flow chart illustrating a process 500 for measuring gesture angles, according to one embodiment. The process 500 begins when the gesture angle module 208 uses gesture data from the gesture recognition module 202 to determine 502 a reference position of the gesture. The reference position is the initial position of the user's hand and forearm within the capture region of the camera system 132, and gesture angles are measured relative to the reference position. The gesture angle module 208 saves the reference position (e.g., by storing the gesture data representing the reference position) to be used later in the process 300 to measure the gesture angles.

After the user begins performing a gesture (e.g., by tilting his hand), the gesture angle module 208 determines 504 a current position of the gesture by analyzing updated gesture data from the gesture recognition module 202. The current position is the instantaneous position of the user's hand and forearm at some point in time after the reference position was determined 502.

After determining 504 the current position of the gesture, the gesture angle module 208 measures 506, 508, 510 gesture angles by comparing the current position to the reference position. A description of how gesture angles are measured in different spatial directions is described below with reference to FIGS. 6A-6C.

FIGS. 6A-6C illustrate examples of gesture angles in three spatial directions. For ease of description, the examples in FIGS. 6A-6C are illustrated with respect to a set of three-dimensional axes that are used consistently throughout the three figures. The same set of axes are also shown in the example gesture 408 of FIG. 4C. In the examples illustrated in FIGS. 6A-6C, the gesture angles are rotational displacements of the hand in three spatial directions. However, the gesture angles may also be measured in a different manner. For example, instead of measuring a rotational displacement of the entire hand, the gesture angle module 208 may measure rotational displacement of one or more outstretched fingers (e.g., a curling motion performed by the index finger). Alternatively, the module 208 may measure rotational displacement of the user's entire forearm.

FIG. 6A illustrates an example of a horizontal gesture angle 602. The gesture angle module 208 measures 506 the horizontal gesture angle 602 by determining an angular displacement in the x-z plane between the reference position and the current position. Similarly, FIG. 6B illustrates an example of a vertical gesture angle 604, and the gesture angle module 208 measures 208 the vertical gesture angle 604 by determining an angular displacement in the y-x plane.

In one embodiment, the gesture angle module 208 measures 506, 508 the horizontal and vertical gesture angles by calculating a centerline of the reference position and a centerline of the current position. Each centerline can be calculated, for example, by drawing a line from the middle of the wrist to the tip of the middle finger (known in the art as the proximo-distal axis). To measure 506 the horizontal gesture angle 602, the two centerlines are projected onto the x-z plane and the gesture angle module 208 determines the angle between the two projections. Similarly, the vertical gesture angle 604 can be measured 508 by projecting the two centerlines onto the y-z plane and determining the angle between the two projections.

FIG. 6C illustrates an example of a rotational gesture angle 606. The gesture angle module 208 measures 510 the rotational gesture angle 606 by determining a rotational displacement about an axis along the length of the user's hand (shown in FIGS. 6A-6C as the z-axis). In one embodiment, the gesture angle module 208 measures 510 the rotational gesture angle 606 by measuring a change in orientation of a plane representing the palm of the user's hand.

Additional Considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. The memory/storage can be transitory or non-transitory. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the embodiments are not described with reference to any particular programming language. It will be appreciated that a variety of programming languages may be used to implement the teachings of the embodiments as described herein, and any references below to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which are set forth in the claims.

Upon reading this disclosure, those of skill in the art will appreciate still additional alternative methods and systems for performing a gesture-based POI search. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present embodiments disclosed herein without departing from the spirit and scope of the subject matter as defined in the appended claims.

What is claimed is:

1. A vehicle-based computer-implemented method for controlling a component of the vehicle, the method comprising:
    identifying a first component of the vehicle based on a first selecting input performed by the user within the vehicle;
    receiving a first data signal representing a gesture performed by the user, the gesture performed in a capture region inside the vehicle;
    performing gesture recognition on the first data signal to determine a first command for controlling the first identified component;
    identifying a second component of the vehicle based on a second selecting input performed by the user within the vehicle, the second identified component different from the first identified component;
    receiving a second data signal representing the same gesture performed by the user in the same capture region within the vehicle; and
    performing gesture recognition on the second data signal to determine a second command for controlling the second identified component, the second command different from the first command.

2. The method of claim 1, wherein the gesture is captured by a camera system, the camera system comprising a plurality of cameras positioned to collectively capture gestures performed in the capture region inside the vehicle.

3. The method of claim 1, wherein performing gesture recognition comprises measuring one or more gesture angles, each gesture angle representing an angular displacement between a current position of the gesture and a reference position of the gesture.

4. The method of claim 3, wherein the gesture angles comprise a horizontal angle, a vertical angle, and a rotational angle.

5. The method of claim 3, wherein the first command is a command for navigating a menu structure based on the gesture angle, and wherein the second command is a command for adjusting a mirror of the vehicle based on the gesture angle.

6. The method of claim 1, wherein the first selecting input comprises a pointing gesture directed at the first component, the pointing gesture performed in the capture region, and wherein identifying the first component comprises performing gesture recognition on an input signal representing the first selecting input.

7. The method of claim 1, wherein the first selecting input comprises a voice command containing a name of the first component, and wherein identifying the first component comprises performing voice recognition on an input signal representing the first selecting input.

8. The method of claim 1, wherein the first selecting input is at least one of a pointing gesture or a voice command.

9. The method of claim 1, further comprising:
    responsive to identifying the first component, sending an output signal to an output device for playback to the user, the output signal indicating that the first component has been selected.

10. A non-transitory computer-readable storage medium for storing computer program instructions for controlling a component of a vehicle, the program instructions when executed by a processor cause the processor to perform steps including:
    identifying a first component of the vehicle based on a first selecting input performed by the user within the vehicle;
    receiving a first data signal representing a gesture performed by the user, the gesture performed in a capture region inside the vehicle;
    performing gesture recognition on the first data signal to determine a first command for controlling the first identified component;
    identifying a second component of the vehicle based on a second selecting input performed by the user within the vehicle, the second identified component different from the first identified component;
    receiving a second data signal representing the same gesture performed by the user in the same capture region within the vehicle; and
    performing gesture recognition on the second data signal to determine a second command for controlling the second identified component, the second command different from the first command.

11. The storage medium of claim 10, wherein the gesture is captured by a camera system, the camera system comprising a plurality of cameras positioned to collectively capture gestures performed in the capture region inside the vehicle.

12. The storage medium of claim 10, wherein performing gesture recognition comprises measuring one or more gesture angles, each gesture angle representing an angular displacement between a current position of the gesture and a reference position of the gesture.

13. The storage medium of claim 12, wherein the gesture angles comprise a horizontal angle, a vertical angle, and a rotational angle.

14. The storage medium of claim 12, wherein the first command is a command for navigating a menu structure based on the gesture angle, and wherein the second command is a command for adjusting a mirror of the vehicle based on the gesture angle.

15. The storage medium of claim 10, wherein the first selecting input comprises a pointing gesture directed at the first component, the pointing gesture performed in the capture region, and wherein identifying the first component comprises performing gesture recognition on an input signal representing the first selecting input.

16. The storage medium of claim 10, wherein the first selecting input comprises a voice command containing a name of the first component, and wherein identifying the first component comprises performing voice recognition on an input signal representing the first selecting input.

17. The storage medium of claim 10, wherein the first selecting gesture is at least one of a pointing gesture or a voice command.

18. The storage medium of claim 10, further comprising instructions for:

responsive to identifying the first component, sending an output signal to an output device for playback to the user, the output signal indicating that the first component has been selected.

19. A vehicle-based computing system for controlling a component of the vehicle, the system comprising:
one or more processors; and
a non-transitory computer-readable storage medium for storing computer program instructions, the program instructions when executed by the processors cause the processors to perform steps including:
identifying a first component of the vehicle based on a first selecting input performed by the user within the vehicle;
receiving a first data signal representing a gesture performed by the user, the gesture performed in a capture region inside the vehicle;
performing gesture recognition on the first data signal to determine a first command for controlling the first identified component;
identifying a second component of the vehicle based on a second selecting input performed by the user within the vehicle, the second identified component different from the first identified component;
receiving a second data signal representing the same gesture performed by the user in the same capture region within the vehicle;
performing gesture recognition on the second data signal to determine a second command for controlling the second identified component, the second command different from the first command.

20. The vehicle-based computing system of claim 19, further comprising a camera system for capturing the gesture, the camera system comprising a plurality of cameras positioned to collectively capture gestures performed in the capture region inside the vehicle.

21. The vehicle-based computing system of claim 19, wherein performing gesture recognition comprises measuring one or more gesture angles, each gesture angle representing an angular displacement between a current position of the gesture and a reference position of the gesture.

22. The vehicle-based computing system of claim 21, wherein the gesture angles comprise a horizontal angle, a vertical angle, and a rotational angle.

23. The vehicle-based computing system of claim 21, wherein the first command is a command for navigating a menu structure based on the gesture angle, and wherein the second command is a command for adjusting a mirror of the vehicle based on the gesture angle.

24. The vehicle-based computing system of claim 19, wherein the first selecting input comprises a pointing gesture directed at the first component, the pointing gesture performed in the capture region, and wherein identifying the first component comprises performing gesture recognition on an input signal representing the first selecting input.

25. The vehicle-based computing system of claim 19, wherein the first selecting input comprises a voice command containing a name of the first component, and wherein identifying the first component comprises performing voice recognition on an input signal representing the first selecting input.

26. The vehicle-based computing system of claim 19, wherein the first selecting input is at least one of a pointing gesture or a voice command.

27. The vehicle-based computing system of claim 19, the computer-readable storage medium further comprising instructions for:
responsive to identifying the first component, sending an output signal to an output device for playback to the user, the output signal indicating that the first component has been selected.

* * * * *